US006201960B1

United States Patent
Minde et al.

(10) Patent No.: US 6,201,960 B1
(45) Date of Patent: Mar. 13, 2001

(54) SPEECH QUALITY MEASUREMENT BASED ON RADIO LINK PARAMETERS AND OBJECTIVE MEASUREMENT OF RECEIVED SPEECH SIGNALS

(75) Inventors: Tor Björn Minde, Gammelstad; Anders Tomas Uvliden, Luleå; Per Anders Karlsson, Luleå; Per Gunnar Heikkilä, Luleå, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/881,750

(22) Filed: Jun. 24, 1997

(51) Int. Cl.$^7$ .............................. H04Q 7/20; H04B 17/00
(52) U.S. Cl. ...................... 455/424; 455/67.5; 455/67.3; 704/237
(58) Field of Search ................................. 455/423, 424, 455/425, 67.3, 226.1, 226.3, 67.5; 704/237, 216

(56) References Cited

U.S. PATENT DOCUMENTS

| 5,023,900 | * | 6/1991 | Tayloe et al. ................ 455/424 |
| 5,095,500 | * | 3/1992 | Tayloe et al. ................ 455/424 |

(List continued on next page.)

FOREIGN PATENT DOCUMENTS

| 4324292 | * | 2/1995 | (DE) | .............................. H04B/17/00 |
| 644674 | | 3/1995 | (EP) | . |
| 0 720 407 A2 | * | 7/1996 | (EP) | ................................ H04Q/7/38 |
| 2 227 885 | * | 8/1996 | (GB) | ................................ H04Q/7/38 |
| 94/00922 | * | 1/1994 | (WO) | .............................. H04B/3/46 |
| 94/05100 | * | 3/1994 | (WO) | .............................. H04B/7/26 |

OTHER PUBLICATIONS

European Patent Office Standard Search Report RS 99796, Jan. 1998.*
Lam et al., "Objective Speech Quality Measure for Cellular Phone", 1996 IEEE International Conference on Acoustics, Speech, and Signal Processing, vol. 1, No. Conf. 21 pp. 487–490 (May 7–10, 1996).*
European Standard Search Report re RS 99796 Date of completion of search: Jan. 20, 1998.
K. H. Lam et al., "Objective Speech Quality Measure for Cellular Phone", 1996 IEEE International Conf. on Acoustics, Speech, and Signal Processing, vol. 1, No. Conf. 21 pp. 487–490 (May 7–10, 1996).

*Primary Examiner*—Edward F. Urban
*Assistant Examiner*—Rafael Perez-Gutierrez
(74) *Attorney, Agent, or Firm*—Burns, Doane, Swecker & Mathis, L.L.P.

(57) ABSTRACT

An improved method and system of measuring the perceived speech quality in mobile telecommunications networks is disclosed herein. In an embodiment of the invention, the method uses both radio link parameters and an objective measuring technique performed on received signals to estimate the speech quality perceived by the end-user. A radio link processing stage extracts temporal information from a set of available radio link parameters such as the BER, FER, RxLev, handover statistics, soft information, and speech energy. Concurrently, a speech processing stage is used to process a sequence of original signals and received signals, obtained from the output of a telecommunications system. The signal sequences are processed by an objective measuring technique such as Perceptual Speech Quality Measure (PSQM). The outputs from the radio link processing and speech processing stages are utilized to calculate an estimate for speech quality. Furthermore, a weight may be given to radio link processing and speech processing in accordance with their performance under various conditions such that the overall speech quality is calculated with respect to the best approach.

27 Claims, 3 Drawing Sheets

U.S. PATENT DOCUMENTS

| | | | |
|---|---|---|---|
| 5,214,687 | * | 5/1993 | Känsäkoski .......................... 455/425 |
| 5,251,237 | * | 10/1993 | Baier .................... 375/346 |
| 5,386,495 | * | 1/1995 | Wong et al. ....................... 455/67.3 |
| 5,432,778 | * | 7/1995 | Minde et al. ....................... 375/343 |
| 5,481,588 | * | 1/1996 | Rickli et al. .......................... 455/423 |
| 5,490,288 | * | 2/1996 | Wiatrowski .......................... 455/423 |
| 5,521,904 | * | 5/1996 | Eriksson et al. .................... 455/67.1 |
| 5,598,431 | * | 1/1997 | Lobel ................................ 455/226.1 |
| 5,621,854 | * | 4/1997 | Hollier ................................ 704/228 |
| 5,623,484 | * | 4/1997 | Muszynski .......................... 455/423 |
| 5,630,210 | * | 5/1997 | Marry et al. ....................... 455/67.3 |
| 5,710,772 | * | 1/1998 | Sato .................................. 455/67.3 |
| 5,721,754 | * | 2/1998 | Chen ................................. 455/67.3 |
| 5,816,801 | * | 9/1998 | Hämäläinen ...................... 455/226.1 |
| 5,848,384 | * | 12/1998 | Hollier et al. ...................... 704/233 |

* cited by examiner

SPEECH QUALITY MEASUREMENT BASED ON RADIO LINK PARAMETERS AND OBJECTIVE MEASUREMENT OF RECEIVED SPEECH SIGNALS

FIELD OF INVENTION

The present invention relates generally to speech quality measurement in wireless telecommunication systems, and pertains more specifically to a method of measuring the speech quality using radio link parameters together with objective measurement techniques based on received speech.

BACKGROUND OF THE INVENTION

In the wireless telecommunication industry, service providers are intensely interested in providing high quality, reliable services for their customers in today's highly competitive environment. For example, reliability problems such as dropped calls and quality issues such as fading, multi-path interference, and co-channel interference are concerns constantly facing cellular operators. Another issue of great interest to operators is the improvement of perceived speech quality by the end user within the cellular system. Therefore, it is desirable for operators to be able to determine which areas in the network are experiencing quality problems.

There have been a number of methods used in the past to measure speech quality in cellular networks. One commonly used method involves testing a cellular network by transmitting known signals and comparing the received signals to a predefined signal database to determine an estimate for the quality. The term signal is used herein to refer to sounds perceptible in the human audio frequency range which include speech and tunes. This method is illustrated in FIG. 1. Depicted is a known signal database 2, wherein predetermined signals are sent through a system under test 4. The system under test 4 represents all the functioning components of a cellular network which includes a mobile switching center (MSC), a radio base station (RBS), all communication links, and the air interface. Once the transmitted signals have been received, a second signal database 6 containing the original signal patterns are compared to the received signals at step 8. An estimate is then calculated for the quality of the received signal for the network.

In digital systems, the conversion of analog speech signals to digital signals requires much more bandwidth for transmission than is desirable. Bandwidth constraints in wireless telecommunication systems have spawned the need for low bit-rate speech coders which work by reducing the number of bits that are necessary to transmit while preserving quality and intelligibility. In general, it is desirable to transmit at lower bit-rates but quality tends to diminish with decreasing bit rates. The speech coders used in these applications work by encoding speech while removing redundancies embedded during speech production.

Typically, speech coders obtain their low bit-rates by modeling human speech production in order to obtain a more efficient representation of the speech signal. The original speech signal can be synthesized using various estimated filter parameters. Since many of the prior art test methods include the use of audio tones in the testing procedure, they do not lend themselves well for testing with digital systems. This is because speech coders are modeled after speech production and are not optimized for tones, thus errors in tone regeneration may likely be encountered.

Another source of potential problems with the method of FIG. 1 when utilizing speech signals is in the compare and estimate step 8. Speech database 2 contains a limited number of repeating predetermined sentences (e.g. 6–8 sentences) that are representative of speech patterns typically made through a mobile network.

The estimate portion in step 8 employs perceptual models that mimic the listening process. Models of this type tend to work well when the direction is small but can experience problems in conditions of high distortion. By way of example, an error condition causing a repetition of a previous frame may sound satisfactory to the listener, especially when involving vowel sounds, but the perceptual model may erroneously determine that the distortion is severe when comparing the frame with the original frame.

A predominant factor affecting speech quality in digital systems is the bit error rate (BER). The BER is the frequency at which bit errors are introduced into the transmitted frames. Bit errors tend to be introduced during transmission over the air interface. High BER situations often occur during conditions of high co-channel interference, weak signals such as mobile roaming out of range, and fading caused by multi-path interference due to obstructions such as buildings etc. Although attempts are made at correcting these errors, an excessively high BER has a detrimental effect on speech quality.

In a Global System for Mobile Communication (GSM) network for example, the BER and other related parameters, such as Receive Quality (RxQual) and Receive Level (RxLev), are monitored to assess speech quality. There are shortcomings in using this method since correlation relationships and temporal information that can be obtained from the parameters are not taken advantage of. For example, the extraction of temporal information permits the formulation of a host of relationships between the variables that can be exploited for measuring speech quality. The perceived speech quality for the end user is associated with time averaging over a length of a sentence at its highest resolution. The final quality is averaged over the whole conversion meaning that the lowest resolution is approximately in the range of several minutes. Therefore the use of derived temporal and correlated parameters, while is lacking in GSM, will give clearer insight as to the state of speech quality experienced for many situations.

The RxQual parameter in the GSM system is measured every 0.5 seconds and is inherently dependent on the BER for each 20 millisecond frame. Further, RxQual can fluctuate widely due to fading, noise or interference which can lead to quality measurements that fluctuate much faster than the perceived speech quality. One seemingly obvious solution would be to increase the temporal resolution with a time constant in the area of 2–5 seconds. But it has been found that the relationship between the digital communications link and speech quality is not solely dependent on a time averaged BER.

What is needed is a method that combines the information obtained from the radio link parameters and signal-based objective measurement techniques such that the benefits of both are attained and the drawbacks of the prior art methods are avoidable.

SUMMARY OF THE INVENTION

To achieve the foregoing and other objectives in accordance with the purpose of the present invention, an improved method and system of measuring the speech quality in a mobile telecommunications network is disclosed herein. In an embodiment of the present invention, the method includes extracting temporal information from a set of available radio link parameters in a radio link processing stage. A set of correlated temporal parameters are then produced from the radio link processing stage. Concurrently, a sequence of original signals and received signals (signals such as speech, tones or otherwise), that are output from the telecommunications system e.g. coded speech from a speech coder, are processed using an objective measuring technique to produce a set of speech processing parameters. The outputs of the radio link processing and speech processing stages are fed into an estimator to calculate the speech quality. Furthermore, a weight may be given to the output from the radio link processing stage and to the speech processing stage in accordance to their relative performance under current mobile connection conditions. The speech quality is then calculated in regard with the appropriate significance assigned to the respective stages for improved performance under various conditions.

In an apparatus aspect of the invention, an improved objective speech quality measuring system for a wireless telecommunication network is disclosed. The system includes a radio link processor for extracting temporal information from radio link parameters. A signal processor is included for objectively measuring (speech) signals. An estimator is included for calculating the overall perceived speech quality by combining the parameters from both the radio link processor and speech processor. The estimator can be implemented as a linear, non-linear, state machine, or a neural network. These and other advantages of the present invention will become apparent upon reading the following detailed descriptions and studying the various figures of the drawings.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE PREFERRED EMBODIMENTS

Figure 1:
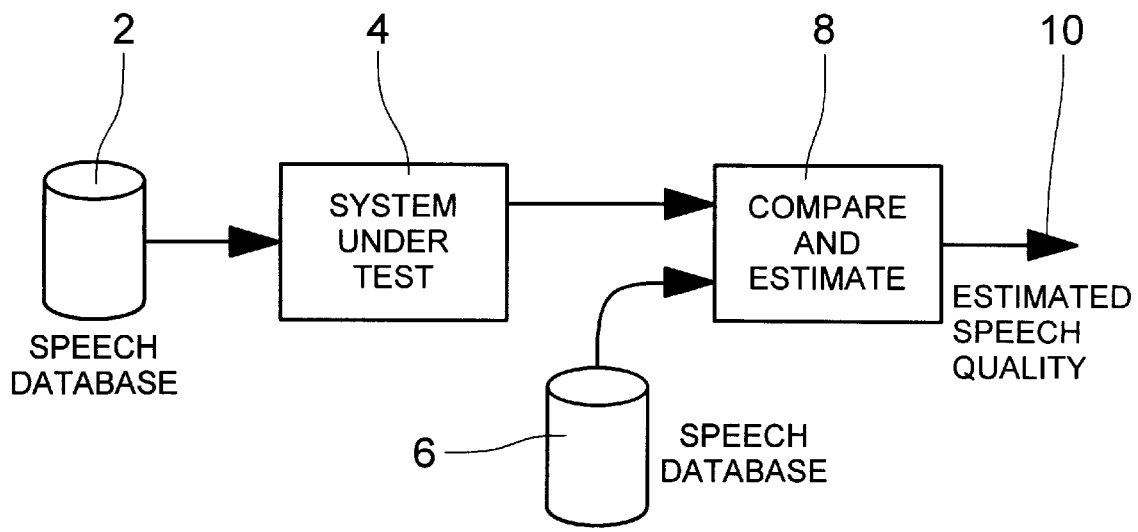
FIG. 1 shows a prior art method of measuring speech quality using signal databases.

A discussion of FIG. 1 directed toward a prior art method of speech quality measurement was provided in the preceding sections. In a basic cellular system, a mobile switching center (MSC) is linked to a plurality of base stations (BS) that are geographically dispersed to form the area of cellular coverage for the system. Each of the base stations are designated to cover a specified area, known as a cell, in which two way radio communication can take place between a mobile station MS and the BS in the associated cell. The quality level of coverage is not uniform for all points in the coverage area because of various uncontrollable factors.

Therefore the perceived quality by the end user provides important information about the current performance level of the network.

The quality of received speech through a mobile telecommunications network can be separated generally into the distinct areas of intelligibility and naturalness. Highly synthesized speech, for example, may have high intelligibility in terms of conveying information but may not necessarily have high quality. Cellular systems utilizing low bit-rate speech coders tend to maintain intelligibility but at the expense of naturalness. In situations where speaker identification is important, e.g. voice recognition applications, the speech quality cannot be compromised. Numerous methods have been proposed to objectively measure speech quality using mathematical models. To date, none have demonstrated exceptional correspondence to subjective evaluations in digital networks. To this end, a technique for estimating the speech quality in digital networks by utilizing both radio link parameters and objective speech processing follows.

Figure 2:
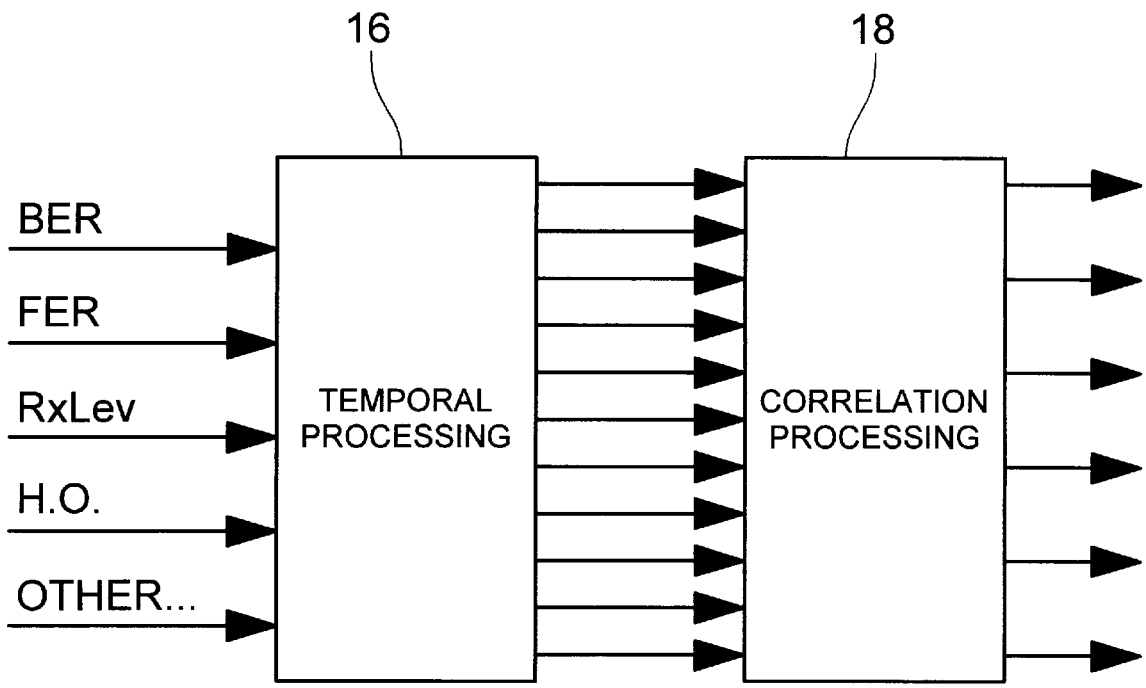
FIG. 2 illustrates a procedure for temporal processing of radio link parameters in accordance with an embodiment of the present invention.

FIG. 2 illustrates a speech quality measurement process that utilizes temporal information obtained from radio link parameters, in accordance with an embodiment of the present invention. Radio link processing is performed by a multi-stage configuration that includes a temporal processing stage 16 and a correlation processing stage 18. Available radio link parameters, e.g. in a D-AMPS network, such as BER, frame error rate (FER), RxLev, handover statistics, soft information, and speech energy are input into temporal processing stage 16. New parameters obtained from temporal information from the radio link parameters are calculated. The application of so-called "sliding windows" or simply "windowing" which includes, for example, rectangular, exponential, or a hamming ($sin^2$) window applied to the parameters to achieve temporal weighting. The parameters can then be correlated by taking, for example, the root, exponential, or log of the function to achieve a more appropriate shape. Moreover, the transformed data can be analyzed with statistical methods which may include determining the maximum value, minimum value, mean value, standard deviation, skewness, kurtosis etc. These processes may be performed independently and in any order to achieve the desired relationships.

Temporal processing is able to extract information on what has occurred with specific parameters during a specified time period. For example, looking at a sequence history of measurements for a variable, it is possible to calculate temporal parameters such as mean value for the last X seconds, estimate the standard deviation during Y seconds, or the autocorrelation function during the last Z seconds. By way of example, the mean BER during the last 3 seconds or the number of erased frames during last 5 seconds are examples of new parameters that can be derived which are closely related to an aspect of speech quality.

Correlation stage 18 combines the original or new parameters, using relationships between them, to produce parameters which are more directly correlated to speech quality. For example, modern cellular systems attempt to conceal the loss of a frame due to bit errors by repeating the previous 20 ms frame with the hope it will not be heard. This means that the number of bit errors in the lost frame are not relevant, since the frame contents never reach the listener. This suggests new parameters correlating more closely with speech quality, such as by combining BER with FrameLoss for example.

In a first example that illustrates temporal and correlation processing, the mean for the BER is calculated over a 0.5 second interval in temporal processing stage 16 to create a new temporal parameter such as $RXQ_{13}$ MEAN_5. In correlation stage 18, $RXQ_{13}$ MEAN_5 parameter is correlated by applying a third power transformation yielding a $(RXQ_{13}$ MEAN_5$)^3$ correlated parameter. A second example may include calculating the FER 5 second intervals to form temporal parameter $FER_{13}$ BURSTS_5$)^{1/22}$. Another example may be to determine the mean residual bit error rate (RBER) during 3 seconds, which is the BER calculated for the "good" frames. It should be noted that temporal processing and statistical analysis may be performed on the correlated parameters and that some calculations, for example the RBER, may be performed on the "raw" data. The parameters may be combined and correlated in various ways as will be appreciated by those skilled in the art to achieve better results for particular situations and it is intended that that all such variations are within the scope of the present invention. Other temporal and correlation processing of parameters are described in Minde co-pending application Ser. No. 08/861,563, entitled: Speech Quality Measurement in Mobile Telecommunication Networks Based On Radio Link Parameters filed on May 22, 1997 which is incorporated by reference herein in its entirety.

Figure 3:
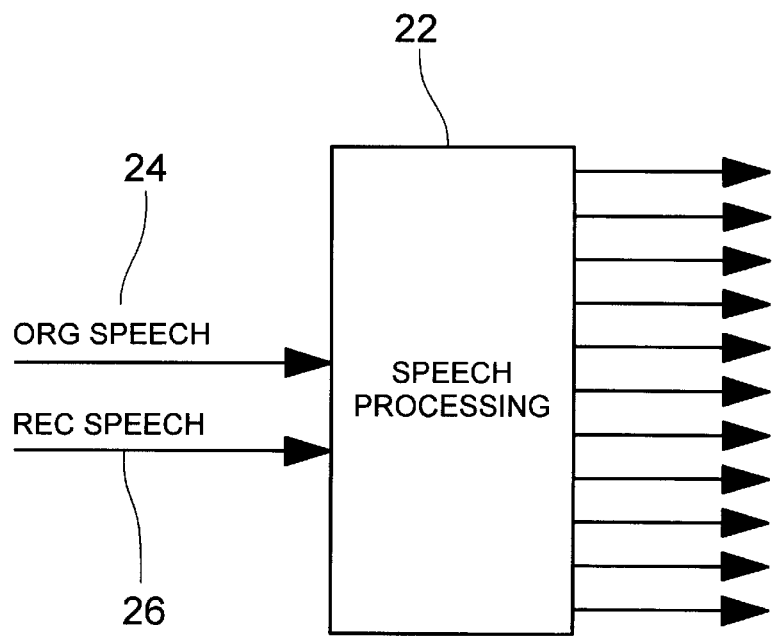
FIG. 3 illustrates a procedure for speech processing of received signals in accordance with an embodiment of the present invention.

FIG. 3 shows an objective speech processing method used in combination with the aforementioned temporal and correlation processing stage. The objective processing measure uses two sequences of the signals to produce a set of highly correlated parameters related to speech quality. A first sequence of signals, containing unaltered original signals 24, enters stage 22 for processing. A second sequence containing received signals 26, which have been sent through the cellular telecommunication system and subjected to distortion.

Figure 4:
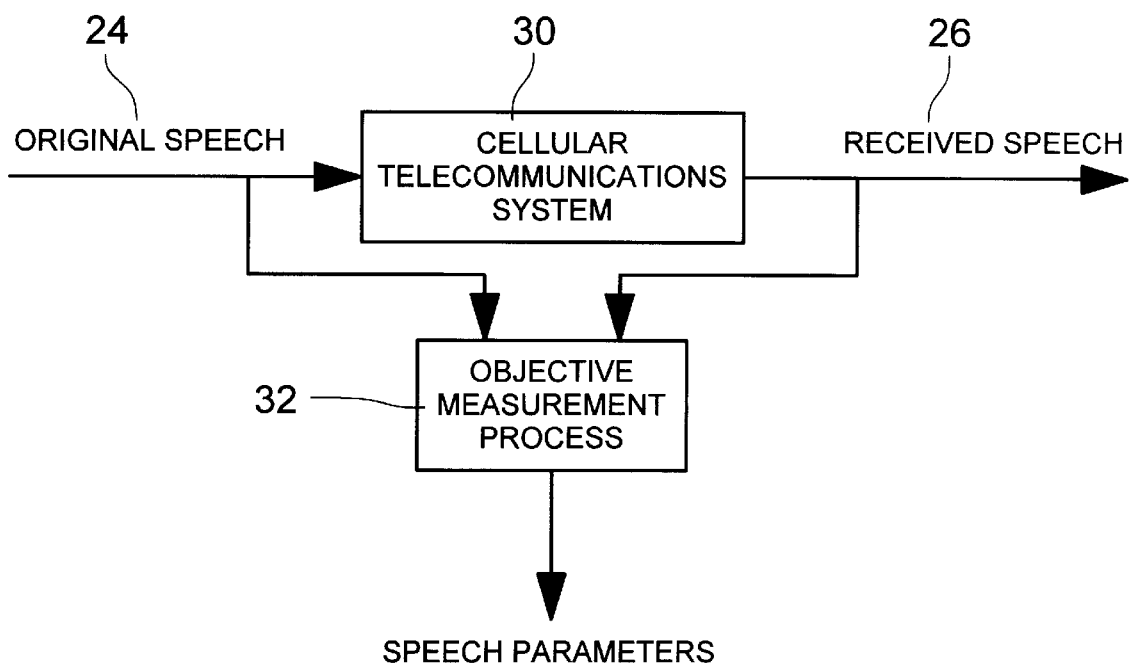
FIG. 4 depicts a flow diagram of the speech processing procedure in accordance with an embodiment of the present invention.

FIG. 4 illustrates a typical method of objective speech quality measurement using the original signal 24 and received signal 26 output from cellular telecommunications system 30. An objective measurement process 32 is applied to original signal 24 and received signal 26 to measure quality characteristics of the signal. Objective measurement techniques generally perform quality measurements on the signal by determining the waveform, spectral, and spectral envelope distortions. By way of example, distortions between the original and received signals are detected and plotted in the time and frequency domains of the signals. Moreover, distortions in the frequency domain can be measured in the spectral characteristics or the spectral envelope of the signals.

One objective measurement technique that works well with the present invention is the so-called Perceptual Speech Quality Measure (PSQM as specified in ITU-T Recommendation P.861). As can be appreciated by those skilled in the art, PSQM has been shown to provide substantial correlation with the subjective quality of coded speech. Various parameters such as listening level, weighting on silent intervals, environmental noise on receiving side, characteristics of hearing threshold, and sending and receiving characteristics of the mobile station are utilized in the method to mimic the sound perception of subjects in "real-life" situations. A more complete description of the PSQM methodology is provided in the foregoing ITU-T P.861 recommendation. Furthermore, those skilled in the art will appreciate that other well known objective measurement methods can be adapted for use with the present invention such as Signal-To-Noise Ratio (SNR), Segmental SNR (SegSNR), Noise-to-Mask Ratio (NMR), and Cepstral Distance (CD) techniques.

Figure 5:
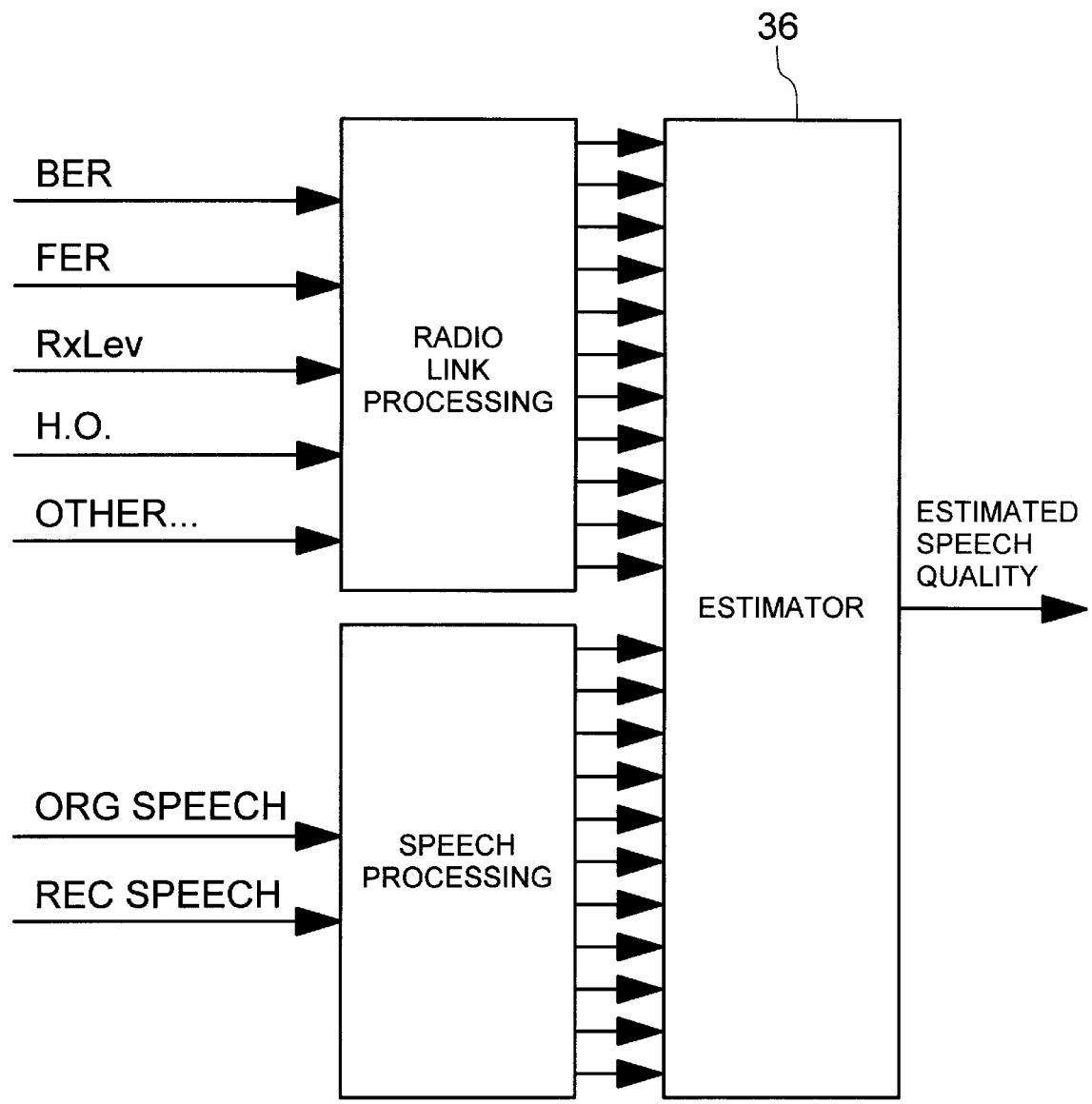
FIG. 5 depicts a diagram for estimating the speech quality using both radio link parameters and speech processing in accordance with an embodiment of the present invention.

FIG. 5 illustrates an embodiment of the present invention for estimating speech quality utilizing both radio link parameters and the processing of received signals. The parameters, correlated or otherwise, are output from the radio link processing and speech processing stages respectively and are input directly into an estimator 36. Estimator 36 combines the parameters and calculates an estimate of the perceived speech quality. The architecture of estimator 36 can be based on variety of mathematical models such as linear, non-linear, a state machine, or a neural network. In many cases, a linear estimator may yield satisfactory results, and can take the form of:

Estimate=A(Parameter 1)=B(Parameter 1)+. . .

Where coefficients A and B are optimized for the best performance. Coefficients may be derived, for example, by using a linear regression technique on a subjectively graded training material, as known to those skilled in the art.

An exemplary procedure using linear estimation can be performed on the correlated parameters of an above example and may take the form:

Estimate=A*(FERS_BURSTS_5)$^{1/2}$+B*(. . .

Although linear estimation often provides adequate results, non-linear estimators may provide more accurate estimation where relationships between the parameters are significantly non-linear. One relatively simple method of non-linear estimation can be performed employing multiple linear estimators which approximate near-linear segments of the curves with successive linear estimators. This multi-linear estimator approach provides relatively simple and accurate modeling for many correlated parameters.

Another type of estimator that can be used with the present invention is a neural network. For example, a neural network estimator may be used to simultaneously record the radio link parameters with test speech. The recorded speech is evaluated by a listening panel where it is rated and combined with the results from the radio link processing and used to train the network. The use of a neural network may be less complicated since the network may be better suited to this task than ordinary estimators. An example of a neural network that works well with the present invention is provided in U.S. Pat. No. 5,432,778 and incorporated herein by reference.

Still another type of estimator that can be used with the present invention is a finite-state machine. An estimator based on a finite-state machine operates by changing state in accordance to some dynamic criteria. For example, the estimator can be configured to change state in response to a change in mobile speed or the change from frequency hopping to non-frequency hopping and vice versa. Various suitable estimators are disclosed in the incorporated co-pending Minde et al. application Ser. No. 08/861,563.

Another aspect of the present invention is the ability to assign respective weights to the radio link processing stage and the signal processing stage. For example, since it is known that high BER levels cause speech processing methods to perform poorly, in this situation, a higher relative weight is therefore given to the processing of radio link parameters than to the received speech processing. Thus, estimator 36 accordingly places higher significance to the radio link parameter processing when calculating the estimate for speech quality. In contrast, higher significance is placed on the speech processing component during low BER conditions, since the objective measurement techniques have better resolution than the radio link parameters under these conditions. Thus the method of shifting the significance between the different processing types, while calculating the speech quality, reduces the probability of performing calculations under high error conditions.

The present invention contemplates an improved method of measuring speech quality in a cellular telecommunication systems by using both radio link parameter and speech processing information. The method provides the flexibility and advantage of using temporal information from radio link parameters together with objective quality measures to provide improved perceived speech quality estimation by the end-user. Improved performance is further realized from the ability to appropriately shift the reliance for estimation in accordance to the best approach under varying conditions.

Although the invention has been described in some respects with reference to a specified preferred embodiment, various modifications and applications thereof will become apparent to those skilled in the art. In particular, the inventive concept may be applied, in addition to D-AMPS, to other Time Division Multiple Access (TDMA) digital-based systems such as Global System for Mobile Communication (GSM) and Personal Digital Cellular (PDC), or to other system types such as Code Division Multiple Access (CDMA) and Frequency Division Multiple Access (FDMA) etc. It is therefore the intention that the following claims not be given a restrictive interpretation but should be viewed to encompass variations and modifications that are derived from the inventive subject matter disclosed.

What is claimed is:

1. A method of estimating the speech quality in a mobile telecommunications network comprising the steps of:
   receiving a set of radio link parameters associated with a received radio signal;
   temporarily processing said radio link parameters to generate a set of temporal parameters, wherein said temporal parameters have a higher correlation with said speech quality than said radio link parameters;
   processing said received radio signal with an original signal that corresponds to said received radio signal to generate a set of signal processing parameters; and
   estimating the speech quality from both said set of temporal parameters and said set of signal processing parameters.

2. A method according to claim 1 wherein said received radio link parameters include BER, FER, RxLev, handover statistics, soft information, and speech energy parameters.

3. A method according to claim 1 wherein the step of processing said received radio signal further comprises using an objective measuring technique of Perceptual Speech Quality Measure (PSQM).

4. A method according to claim 1 wherein the step of processing said received radio signal further comprises computing the distortion between the original signal and the received radio signal.

5. A method according to claim 1 wherein the step of processing said received radio signal further includes applying an objective processing technique selected from a group consisting of Signal-to-Noise Ratio, Segmental SNR, Noise-to-Mask Ratio, and Cepstral Distance.

6. A method according to claim 1 wherein the estimating step further includes the step of identifying the stat of a mobile connection from the radio link parameters and the signal processing parameters.

7. A method according to claim 1 wherein the estimating step further includes the step of assigning a weighted value to the temporal parameters and to the signal processing parameters relative to the performance of a particular mobile connection state.

8. A method according to claim 7 wherein the estimating step further includes the step of shifting the relative significance between the correlated temporal parameters and the signal processing parameters, wherein an estimate of the speech quality is calculated in accordance to their weighted values.

9. A method according to claim 7 wherein the estimating step uses linear estimation.

10. A method according to claim 7 wherein the estimating step uses non-linear estimation.

11. The method of claim 1, wherein said step of temporally processing said radio link parameters further comprises the step of:
    calculating a radio link parameter over an interval having a duration that is selected to provide said higher correlation with said speech quality.

12. The method of claim 11 wherein said radio link parameter is bit error rate, said interval is 0.5 seconds and said step of calculating further comprises the step of:
    determining a mean bit error rate of said received radio signal over 0.5 seconds.

13. The method of claim 11 wherein said radio link parameter is frame erasures, said interval is 5 seconds and said step of calculating further comprises the step of:
    determining a number of frame erasures which occur in said received radio signal over 5 seconds.

14. The method of claim 11 wherein said radio link parameter is frame erasures, said interval is 3 seconds and said step of calculating further comprises the step of:
    determining a mean residual bit error rate of said received radio signal over 3 seconds.

15. A speech quality measuring system for wireless telecommunication networks that receive a set of radio link parameters associated with a received radio signal comprising:
    a radio link parameter processor for temporally processing said radio link parameters to generate a set of temporal parameters, wherein said temporal parameters have a higher correlation with said speech quality than said radio link parameters;
    a signal processor for processing said received radio signal with an original signal that corresponds to said received radio signal to generate a set of signal processing parameters; and
    an estimator for estimating speech quality from the output from the radio link parameter processor and the speech signal processor.

16. A speech quality measuring system according to claim 15 wherein the radio link parameters include BER, FER, RxLev, handover statistics, soft information, and speech energy parameters.

17. A speech quality measuring system according to claim 15 wherein the estimator is a linear estimator.

18. A speech quality measuring system according to claim 15 wherein the estimator is a non-linear estimator.

19. A speech quality measuring system according to claim 15 wherein the estimator is a neural estimator.

20. A speech quality measuring system according to claim 15 wherein the estimator comprises multiple linear estimators.

21. A speech quality measuring system according to claim 15 wherein the estimator comprises a state machine configured to alter state in response to a change in any of said parameters.

22. A speech quality measuring system according to claim 15 wherein the estimator comprises a state machine configured to alter state in response to the speed of a moving mobile station.

23. A speech quality measuring system according to claim 15 wherein the estimator comprises a state machine configured to alter state in response to the change from frequency hopping to non-frequency hopping and vice versa.

24. The speech quality measuring system according to claim 15, wherein the radio link parameter processor calculates a radio link parameter over an interval having a duration that is selected to provide said higher correlation with said speech quality.

25. The speech quality measuring system according to claim 15, wherein the radio link parameter is bit error rate, said interval is 0.5 seconds and the radio link parameter processor determines a mean bit error rate of said received radio signal over 0.5 seconds.

26. The speech quality measuring system according to claim 15, wherein the radio link parameter is bit error rate, said interval is 5 seconds and the radio link parameter processor determines a number of frame erasures which occur in said received radio signal over 5 seconds.

27. The speech quality measuring system according to claim 15, wherein the radio link parameter is bit error rate, said interval is 3 seconds and the radio link parameter processor determines a mean residual bit error rate of said received radio signal over 3 seconds.

* * * * *